(12) United States Patent
Fort Filgueira et al.

(10) Patent No.: US 10,788,044 B2
(45) Date of Patent: Sep. 29, 2020

(54) FLUID IMPELLER CONTROLLER

(71) Applicant: HEWLETT-PACKARD DEVELOPMENT COMPANY, L.P., Spring, TX (US)

(72) Inventors: Aleix Fort Filgueira, Sant Cugat del Valles (ES); Antonio Gracia Verdugo, Sant Cugat del Valles (ES); Albert Franco Morera, Sant Cugat del Valles (ES); Simone Micheli, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/470,949

(22) PCT Filed: Apr. 25, 2017

(86) PCT No.: PCT/US2017/029378
§ 371 (c)(1),
(2) Date: Jun. 18, 2019

(87) PCT Pub. No.: WO2018/199928
PCT Pub. Date: Nov. 1, 2018

(65) Prior Publication Data
US 2019/0345950 A1    Nov. 14, 2019

(51) Int. Cl.
*F04D 27/00* (2006.01)
*B41J 11/00* (2006.01)
(Continued)

(52) U.S. Cl.
CPC .......... *F04D 27/001* (2013.01); *B41J 11/002* (2013.01); *F04D 13/06* (2013.01); *F04D 27/004* (2013.01);
(Continued)

(58) Field of Classification Search
CPC ...... F04D 27/001; F04D 13/06; F04D 27/004; F04D 27/007; F04D 29/002; B41J 11/002; B41J 29/377; F05D 2270/335
See application file for complete search history.

(56) References Cited

U.S. PATENT DOCUMENTS

| 5,282,388 A | 2/1994 | Czajkowski |
| 5,784,090 A | 7/1998 | Seleasky Et At |
| (Continued) | | |

FOREIGN PATENT DOCUMENTS

| JP | 2000235338 A | 8/2000 |
| JP | 4084309 B2 | 4/2008 |
| (Continued) | | |

OTHER PUBLICATIONS

IP.com search (Year: 2020).*
(Continued)

*Primary Examiner* — Lisa Solomon
(74) *Attorney, Agent, or Firm* — HP Inc. Patent Department

(57) ABSTRACT

Circuits for controlling an impeller in a fluid flow distribution system to achieve a target fluid flow are disclosed. The circuit to output a signal representative of a speed value ($N_T$) of the impeller derived from a stored power consumption value ($W_i$) and speed value ($N_i$) pairs to achieve the target fluid flow. The circuit to receive a power signal representative of an input power consumption value (W) of the impeller at the speed value ($N_T$) to input fluid to the fluid flow distribution system and to compare the value (W) represented by a power signal for the speed value ($N_T$) with the stored value ($W_i$) and impeller speed value ($N_i$) pairs to determine a least difference impeller speed value ($N_L$) of the
(Continued)

stored pair comprising a least difference between the value (W) and the value ($W_i$). The circuit to output a speed signal representative of value ($N_L$).

15 Claims, 4 Drawing Sheets

(51) Int. Cl.
    *F04D 13/06*         (2006.01)
    *F04D 29/00*         (2006.01)

(52) U.S. Cl.
    CPC ......... *F04D 27/007* (2013.01); *F04D 29/002* (2013.01); *F05D 2270/335* (2013.01)

(56) References Cited

U.S. PATENT DOCUMENTS

| | | | |
|---|---|---|---|
| 10,528,065 B1 * | 1/2020 | Sidhom | ................ G05D 7/0635 |
| 2004/0101412 A1 | 5/2004 | Kallman et al. | |
| 2009/0167228 A1 | 7/2009 | Chung et al. | |
| 2012/0009863 A1 | 1/2012 | Sun et al. | |
| 2015/0132020 A1 | 5/2015 | Saito et al. | |
| 2016/0040679 A1 | 2/2016 | Wang et al. | |
| 2017/0010012 A1 | 1/2017 | Ho et al. | |
| 2017/0066660 A1 | 3/2017 | Baldauf et al. | |

FOREIGN PATENT DOCUMENTS

| | | |
|---|---|---|
| RU | 2602401 C1 | 11/2016 |
| WO | WO-2015006777 A2 | 1/2015 |

OTHER PUBLICATIONS

Tutco Heating Soltions Group, "Air Heaters and Dryers for Flexographic and Gravure Printing," 2016, 3 p. Online < https://farnam-custom.com/applications/air-dryers-flexographic-gravure/ >.

HPDC, "International Search Report and Written Opinion," Jan. 11, 2018, International App. No. PCT/US2017/029378, 6 p.

HPDC, "Extended European Search Report," dated May 25, 2020, EPO App. No. 17907078.4, 9 p.

* cited by examiner

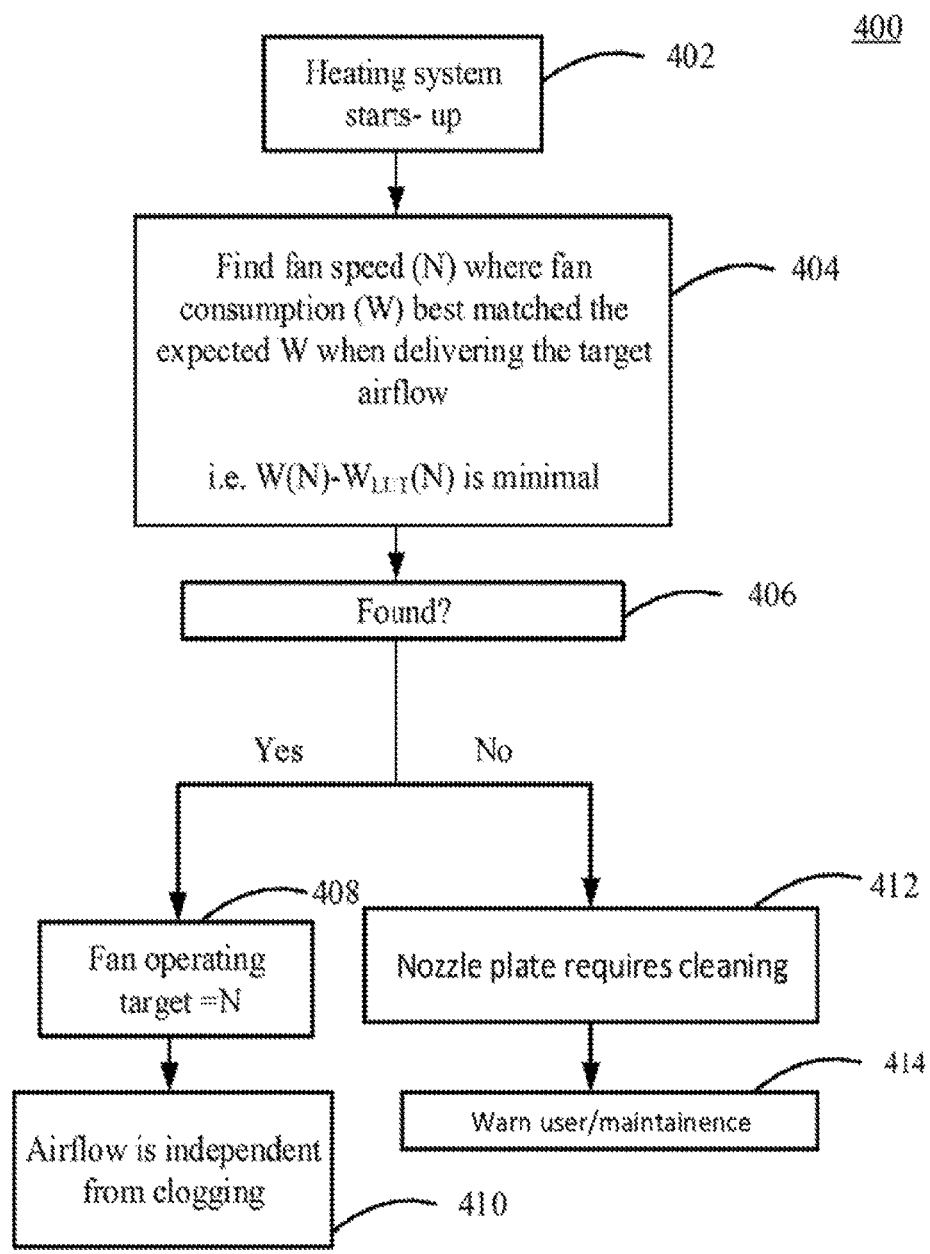

FLUID IMPELLER CONTROLLER

BACKGROUND

In a printer using a hot air circulation system, for example for curing or drying printed inks, airflow nozzles of a nozzle plate of the airflow distribution system may become partially or wholly occluded by contaminates, for example dust and ink particles. Such clogging may reduce airflow, which in turn may result in a loss of performance in the curing or drying of printed inks. Consequently, the nozzle plate and or nozzles should be cleaned before degradation in print quality becomes too severe. However, printer downtime for cleaning the nozzle plate and nozzles is undesirable. This may be more of an issue in hot air circulation systems which are unfiltered.

LIST OF FIGURES

The following description is provided by way of example and with reference to the accompanying drawings, in which:

FIG. 3 is a table of fan speed and power consumption pairs for different fan speeds in accordance with an example;

FIG. 4 is an example process flow control diagram in accordance with an example;

DESCRIPTION

Figure 1:
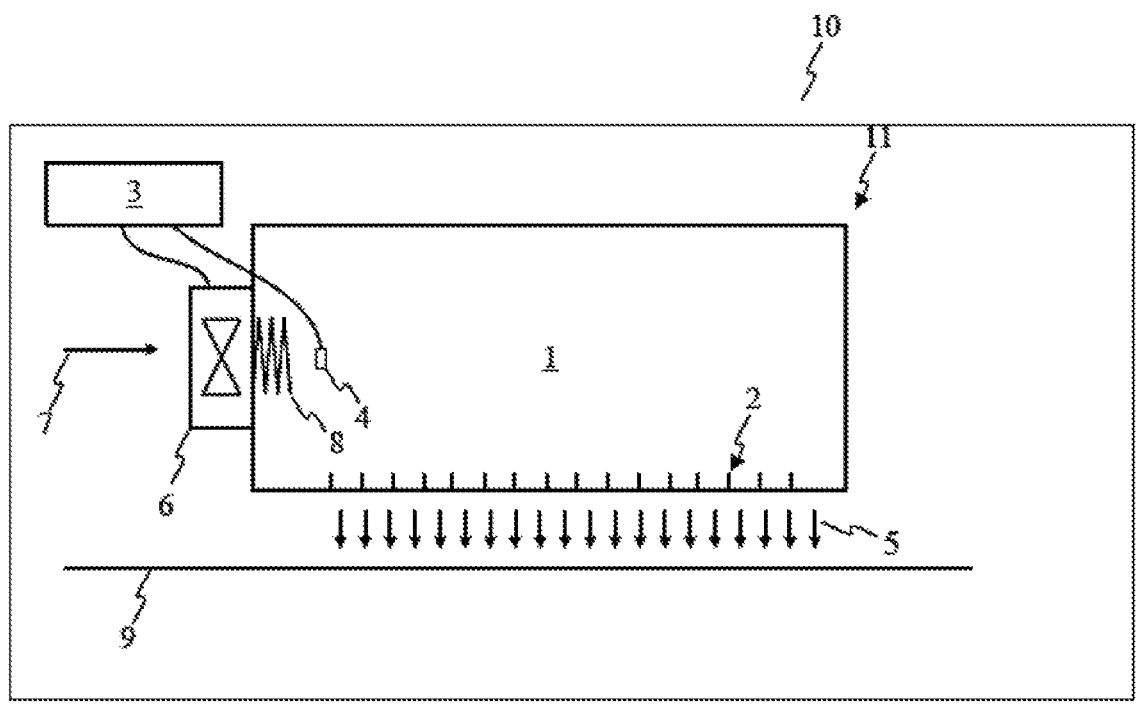
FIG. 1 is a schematic illustration of an example hot air circulation system in accordance with an example.
Figure 2:
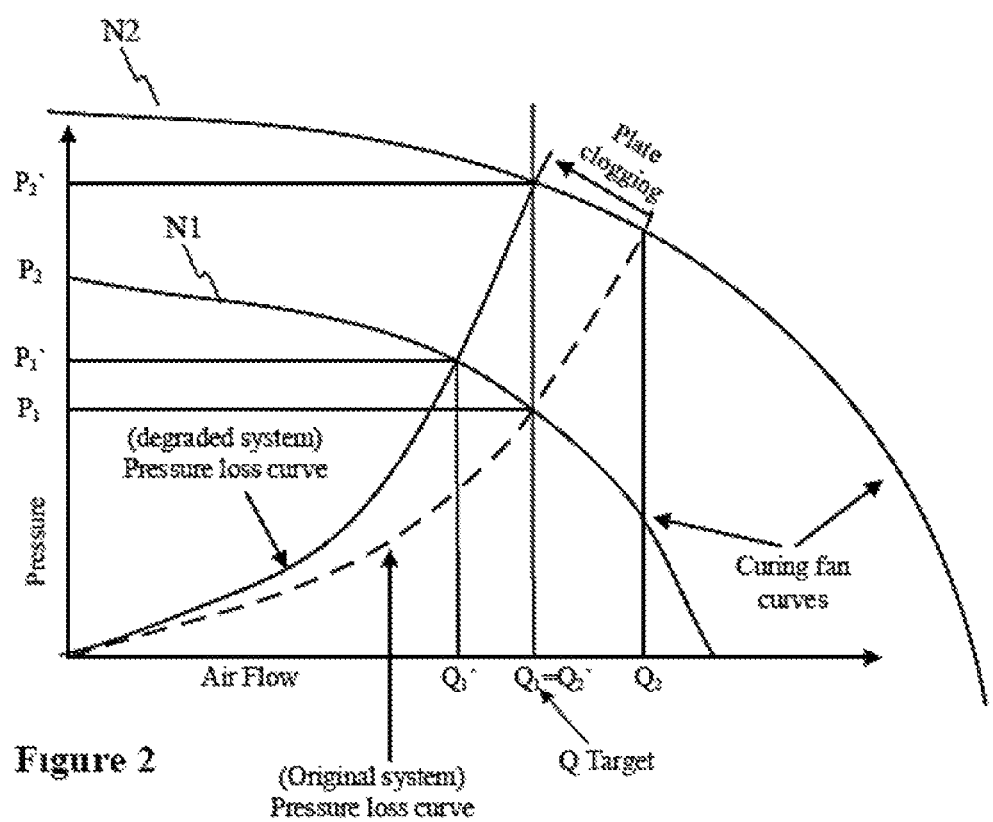
FIG. 2 is a graphical illustration of an example relationship between pressure and airflow for a hot air circulation system in accordance with an example.

In general overview and with reference to examples shown in FIGS. 1 and 2, in accordance with the present example, a circuit 3 for controlling a fluid impeller 6 in a fluid flow distribution system 11 to achieve a target fluid flow is shown. The circuit 3 is designed to output a speed signal representative of a speed value (NT) of the fluid impeller 6 derived from a stored power consumption value (Wi) and fluid impeller speed value (Ni) pairs to achieve the target fluid flow 5. The circuit 3 is also designed to receive a power signal representative of an input power consumption value (W) of the fluid impeller 6 at the speed value (NT) to input a fluid to the fluid flow distribution system 11 and to compare the power consumption value (W) represented by the power signal input to the circuit 3 for the fluid impeller speed (NT) with the stored power consumption value (Wi) and fluid impeller speed value (Ni) pairs to determine a least difference fluid impeller speed value (NL) of the stored pair comprising a least difference between the input power consumption value (W) and the power consumption value (Wi). The circuit 3 is designed to be responsive to determining the least difference fluid impeller speed value (NL) to output a speed signal representative of the least difference fluid impeller speed value (NL).

The present disclosure also relates to a method for controlling a fluid impeller in a fluid flow distribution system 11 to achieve a target fluid flow 5, the method comprising outputting a speed signal representative of a speed value (NT) of the fluid impeller derived from a stored power consumption value (Wi) and fluid impeller speed value (Ni) pairs to achieve the target fluid flow 5. The method also relates to receiving a power signal representative of an input power consumption value (W) of the fluid impeller 6 at the speed value (NT) to input a fluid to the fluid flow distribution system 11 and comparing the power consumption value (W) represented by the power signal input to the circuit 3 for the fluid impeller speed (NT) with the stored power consumption value (Wi) and fluid impeller speed value (Ni) pairs to determine a least difference fluid impeller speed value (NL) of the stored pair comprising a least difference between the input power consumption value (W) and the power consumption value (Wi). The method is responsive to determining the least difference fluid impeller speed value (NL) to output a speed signal representative of the least difference fluid impeller speed value (NL).

The present disclosure may be used to indirectly control airflow by measuring power consumption of the fluid impeller 6 and to determine power consumption at or close to the measured power consumption and operating the fluid impeller 6 at a speed paired with the determined power consumption to produce an airflow 5 at or close to a target airflow 5. This may be achieved using existing circuitry with little modification and additional components.

The present disclosure may compare the power consumption value (W) represented by the power signal input to the circuit for the fluid impeller speed (NL) with each of the stored power consumption value (Wi) and fluid impeller speed value (Ni) pairs to determine a second least difference fluid impeller speed value (N'L) of the stored pair comprising a least difference between the input power consumption value (W) and the power consumption value (Wi). This may monitor airflow during operation of the fluid flow distribution system and adjust the speed of the fluid impeller 6 to maintain operation at or close to a target airflow 5 based on measured fluid impeller power consumption.

A speed signal representative of a speed value (NT) to achieve the target fluid flow 5 may be output responsive to initiation of operation of the fluid impeller 6. In this way, the operation of the fluid flow distribution system 11 may be initiated with a fluid impeller speed for which the system was designed or had been calibrated as a start point.

The speed signal representative of a speed value (NT) to achieve the target fluid flow 5 is initially derived from the stored power consumption value (Wi) and fluid impeller speed value (Ni) pair comprising a lowest speed value of fluid impeller speed value (Ni). Such a start point may provide a lowest power consumption start point.

The stored power consumption value (Wi) and fluid impeller speed value (Ni) pairs may be stored in a memory store which may be a part of the circuit 3 or, at least in part, remote from the circuit 3.

The circuit 3 may be implemented using processor, comprising processor executable instructions to implement the circuit function and operation.

Turning now to FIG. 1, there is schematically illustrated a printer 10 including a fluid flow distribution system 11 utilising hot air circulation. In the present disclosure there is a chamber 1 into which air is pumped and which provides a plenum for supply of pressurised air to nozzle plate 2. Airflow 7 into the chamber 1 is created by an impeller fan 6 comprising rotating blades. The rotating blades act as impeller elements and the airflow is proportional to the speed of rotation of the blades (N). The airflow 7 is drawn into chamber 1 over heater element 8 which heats the air. Such a hot air circulation fluid flow distribution system 11 may be used for inks which require drying or curing and may include inks such as latex or other rubber compound inks and inks including other compounds or compositions requiring curing.

The air in chamber 1 is pressurized under the influence of fan 6 and from there evenly distributed through the nozzle plate 2 resulting in a hot airflow 5 impacting on the printed surface 9. The control circuit 3 may control the fan 6 and the heater element 8 based on multiple parameters that may include the conditions inside the chamber 1 sensed with sensors 4 such as for temperature or pressure or both, for example. The fluid distribution system 1 is located in the printer 100 just prior to the document exit tray.

Such systems may degrade over time as contaminants, for example dust and ink particles, suspended on the incoming airflow 7 may accumulate on the nozzles 2 through which the air is blown 2. When nozzles of nozzle plate 2 clog, the hot airflow 5 may be reduced and this may result in a loss of curing or drying performance. A result of degradation may be poor or even bad quality prints (i.e. not cured/dried) and so re-calibration and/or cleaning of the hot air circulation fluid flow distribution system may be scheduled to take place.

The airflow 5 is dependent on the pressure in the chamber 1 which is dependent on the amount of air per unit time, i.e. volume of air, the fan 6 forces into chamber 1, i.e. the speed of rotation of fan 6. Thus, if fan 6 may be controlled to rotate at a speed N where the airflow is constant regardless of the clogging of the nozzles of nozzle plate 2 then the airflow may be maintained at a target rate, for example suitable for curing and or drying inks on the printed surface 9.

To maintain airflow at or close to a target airflow previously derived for the printer, the fan speed is kept at or close to a target fan speed (NT) previously established as providing the target airflow 5 for the conditions in the chamber 1. The target fan speed (NT) will vary depending on the pressure in chamber 1 to maintain the target airflow 5 through nozzle plate 2. Likewise, the power (W) to operate the fan 6 at the target speed (NT) is dependent on the pressure in chamber 1. The pressure in chamber 1 to maintain a target airflow 5 is dependent on how clear and free from accumulated contaminants are the airflow nozzles of nozzle plate 2. The greater the occlusion of the nozzles of nozzle plate 2 the greater the pressure to be overcome to achieve the target airflow 5 and hence the greater the power consumption (W) of a fan 6 operating at a target speed (NT). The target speed (NT) may be considered to be the speed at which the fan 6 is to operate to achieve a target airflow.

FIG. 2 illustrates the relationship between pressure (P) and airflow (Q) in a fluid flow distribution system in accordance with the present disclosure for a fan speed (N).

The fan power consumption (W) depends on (P) and (Q), where (Q) is the airflow 5 through nozzle plate 2. For each pressure loss curve there is a single (W) value at the desired (Q). In FIG. 2 the broken line represents a pressure (P) against airflow (Q) curve. Additionally, the speed of operation of a fan will result in different airflow (Q) for different pressures (P).

A target airflow (Q target) will be produced for a fan speed (N1) at a pressure (P1). If the airflow at speed (N1) should reduce to (Q'1), for example due to contaminants occluding nozzles of the nozzle plate 2, the pressure in chamber 1 will increase to (P'1). However, at another fan speed (N2) the target airflow (Q target) can be achieved although the pressure in chamber 1 will have increased to (P'2). Movement along the (N2) speed curve from a position of an airflow (Q2) at a pressure (P2) is caused by occlusion of the nozzle plate 2.

The amount of work fan 6 expends running at a given speed (Ni) will depend on the pressure in chamber 1. The greater the pressure the greater the work and the more power is to be delivered to the fan 6. Thus, the power consumption at a given fan speed (Ni) can be measured and this would be representative of the pressure. Therefore, a fluid distribution system may be calibrated by experimentation or by calculation or both to determine the power (Wi) delivered to a fan 6 for a fan speed (Ni) for a target airflow at a pressure (Pi) in the chamber 1. In this way, an indirect measurement of airflow may be achieved through the monitoring of power consumption (Wi) of the fan at a given fan speed (Ni).

Utilising the teaching of the present disclosure, a look up table, FIG. 3, that contains pairs of power consumption Wi for different fan speeds Ni when delivering the target airflow may be derived. Such a look up table may be derived for each fluid flow distribution system or printer as part of a calibration routine during manufacture of the fluid flow distribution system or printer.

The present disclosure comprises a control circuit 3 implemented by way of a programmable integrated circuit such as a microcontroller. The control circuit 3 controls fan speed (N) and senses the power consumption (W) of the fan by sensing the electrical current and electric voltage delivered to the fan. A signal representative of the fan speed (N) is input to the control circuit, for example from reading the fan tachometric signal or, in the case of a fan integrating servo control electronics for example, by taking the Pulse Width Modulated (PWM) signal as an indication of the fan speed. The power consumption (W) may be calculated by the control circuit 3 by multiplying the voltage and current input to the control circuit 3.

The control circuit 3 comprises the look up table illustrated in FIG. 3 that contains pairs of power consumption Wi for different fan speeds Ni when delivering the target airflow. The look up table may be located remote from the control circuit 3 and accessed by the circuit 3 via a communications network.

In accordance with the present disclosure fan 6 is a servo driven impeller fan and control circuit 3 receives the PWM signal used to drive the servo for fan 6 which is indicative of the speed (N) of fan 6. Control circuit 3 also receives signals indicative of the power consumption (W) of the fan 6. To the extent that the control circuit 6 outputs the PWM signal to the servo for fan 6 it in effect receives the PWM signal by monitoring what is output as the PWM signal.

In the described disclosure, the microcontroller of control circuit 3 operates in accordance with the process flow control diagram 400 illustrated in FIG. 4. Process flow control diagram 400 sets out operation of the control circuit 3 implemented in the microcontroller by way of a set of executable instructions, which may be referred to as a computer program, routine or application.

Operation of the microcontroller of control circuit 3 in accordance with the process flow control diagram 400 starts with the microcontroller initiating the heating system to start-up, 402. Then, process control flows to the next stage 404 at which stage the controller seeks the fan speed, target speed (NT), with a power consumption (W) which best matches the expected power consumption when delivering the target airflow. In the described disclosure the control circuit 3 accesses the speed-power pair look up table illustrated in FIG. 3 and sends an output speed signal to fan 6 corresponds to the first speed entry (N1) in the table.

The control circuit 3 receives the power signal indicative of a consumption (W) of fan 6 and searches the look up table of pairs of power consumption (Wi) and fan speed (Ni) for a fan speed Ni at which the fan consumes power (W) best matched to the power consumption indicated for that fan speed Ni in accordance with the graphical relationships illustrated in FIG. 2. That is to say, determine which speed results in the least difference between the measured fan power consumption (W) at that speed and the predicted power consumption (Wi) at that speed and which may be expressed algebraically looking for a minimum value for the relationship:

$$W(N)-Wi(Ni), \tag{1}$$

where W(N) is the measured power consumption at a fan speed (N) and Wi(Ni) is the power consumption Wi indicated in the table for a corresponding speed (Ni).

Control circuit 3 inspects the look up table and applies the relationship (1) in a sequential fashion to determine which of the power/speed pairs gives a minimal absolute (ignore positive or negative signs) power value, WL(NL).

If a minimal power value (WL) is found, 406, process control flows to stage 408, where control circuit 3 outputs a PWM signal to operate fan 6 at the corresponding minimal power speed, (NL). In this way, the target airflow may be achieved or airflow close to the target airflow may be achieved without direct measurement of the airflow. Process control may then flow to stage 410 at which it is determined that the nozzles of nozzle plate 2 are sufficiently clear from clogging so as to allow proper operation of the fluid distribution system 1.

If no minimal absolute value is found at stage 406 then process control flows to stage 412 and control circuit 3 may set a flag indicating that nozzle plate 2 requires cleaning. Responsive to the setting of such a flag process control flows to stage 414 at which an alert is indicated to the user warning them that maintenance should be undertaken.

During operation of the fluid flow distribution system 1 control circuit 3 may continue to monitor the power consumption of fan 6 to derive a new least power speed (N'L) by returning to stage 404.

In an embodiment of the disclosure, control circuit 3 my include a threshold test in stage 404 to determine if a minimal value derived from the table is within acceptable operational limits. For example, if the minimal value is too great so as to require operation of the fan at a speed or power that would lead to damage, unreasonable wear or destruction of the fan it should not be used.

Figure 6:
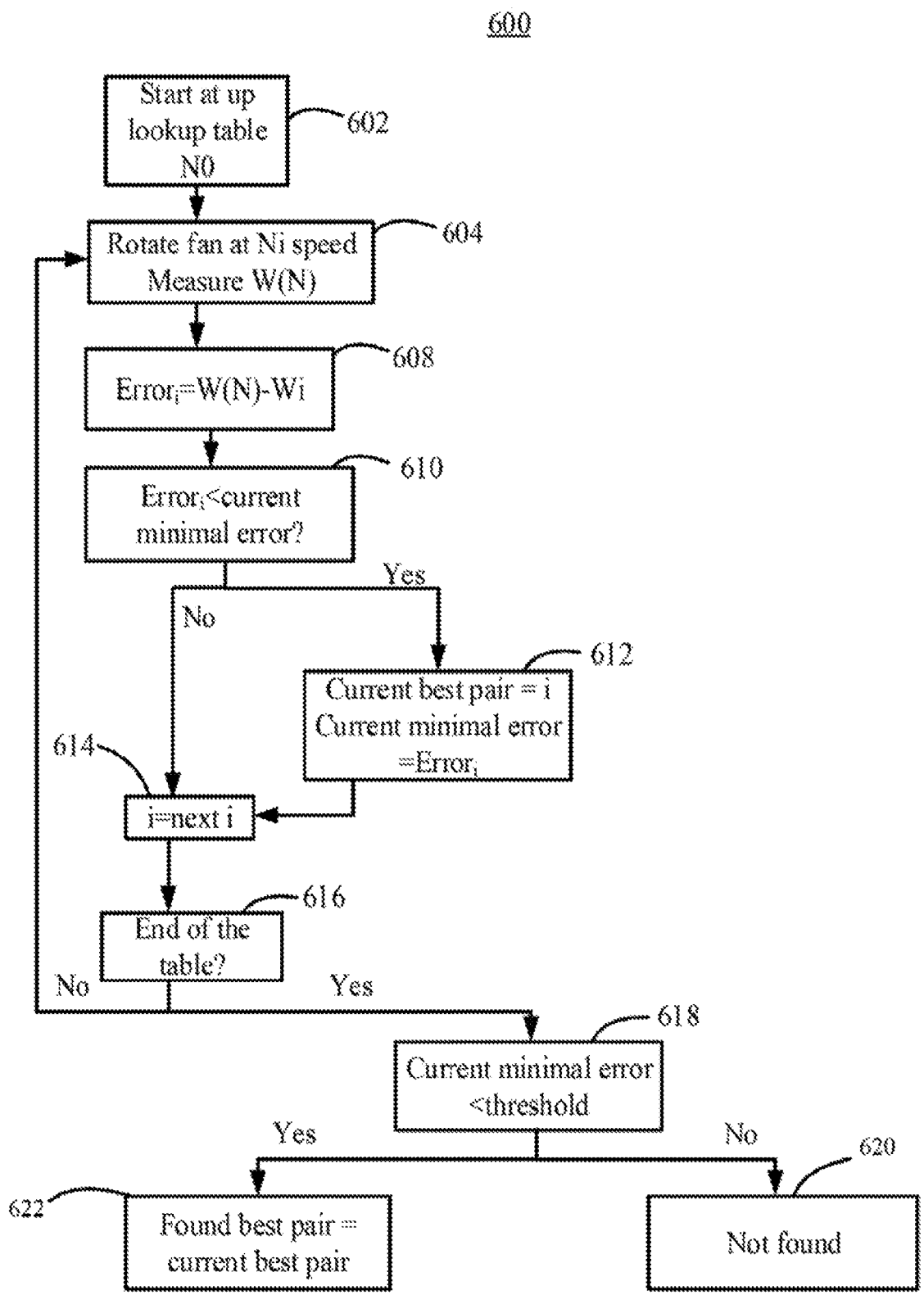
FIG. 6 is in accordance with an example of a process flow control diagram for a sub-routine to implement stage 404 of the process flow control diagram illustrated in FIG. 4.

Turning now to FIG. 6, there is illustrated a process flow control diagram 600 for a sub-routine to implement an example of stage 404 of the process flow control diagram of FIG. 2. The term "sub-routine" does not indicate any particular hierarchy but just that stage 404 may be implemented by calling the process illustrated in FIG. 6. Process flow control diagram 600 starts at stage 602 with inspecting the look table of FIG. 3 to determine the first fan speed, Ni, in the table, i.e. fan speed N0. At stage 604 the control circuit 3 sends a speed signal to fan 6 at the fan speed Ni, initially N0.

At stage 608 the error, i.e. difference, in the values between the measured power consumption and the power consumption indicated for the speed Ni at which the fan 6 is being rotated. The error is tested at stage 610 to determine if the error is less than the current minimal error and if so process flow control flows to stage 612 where the current speed/power pair is assigned as the best pair and the current minimal error is assigned as the error for that best pair.

Process flow control then proceeds to stage 614 where the index i for the look up table is incremented by one and a check for the end of table is conducted at stage 616. If the end of the table has not been reached flow control proceeds to stage 604.

If the determination of the error at stage 610 is not lower than the current minimal error process flow control flows to stage 614.

If the result of the test at stage 616 is "yes" control flows to stage 618 where it is determined if the current minimal error is less than a threshold value. If stage 618 gives a "yes" result control flows to stage 622 where the best pair is assigned as the current best pair and is used to control the speed of the fan. If the result of stage 618 is "no" it is determined at stage 620 that a satisfactory speed is not found and an alert for maintenance is set.

Figure 5:
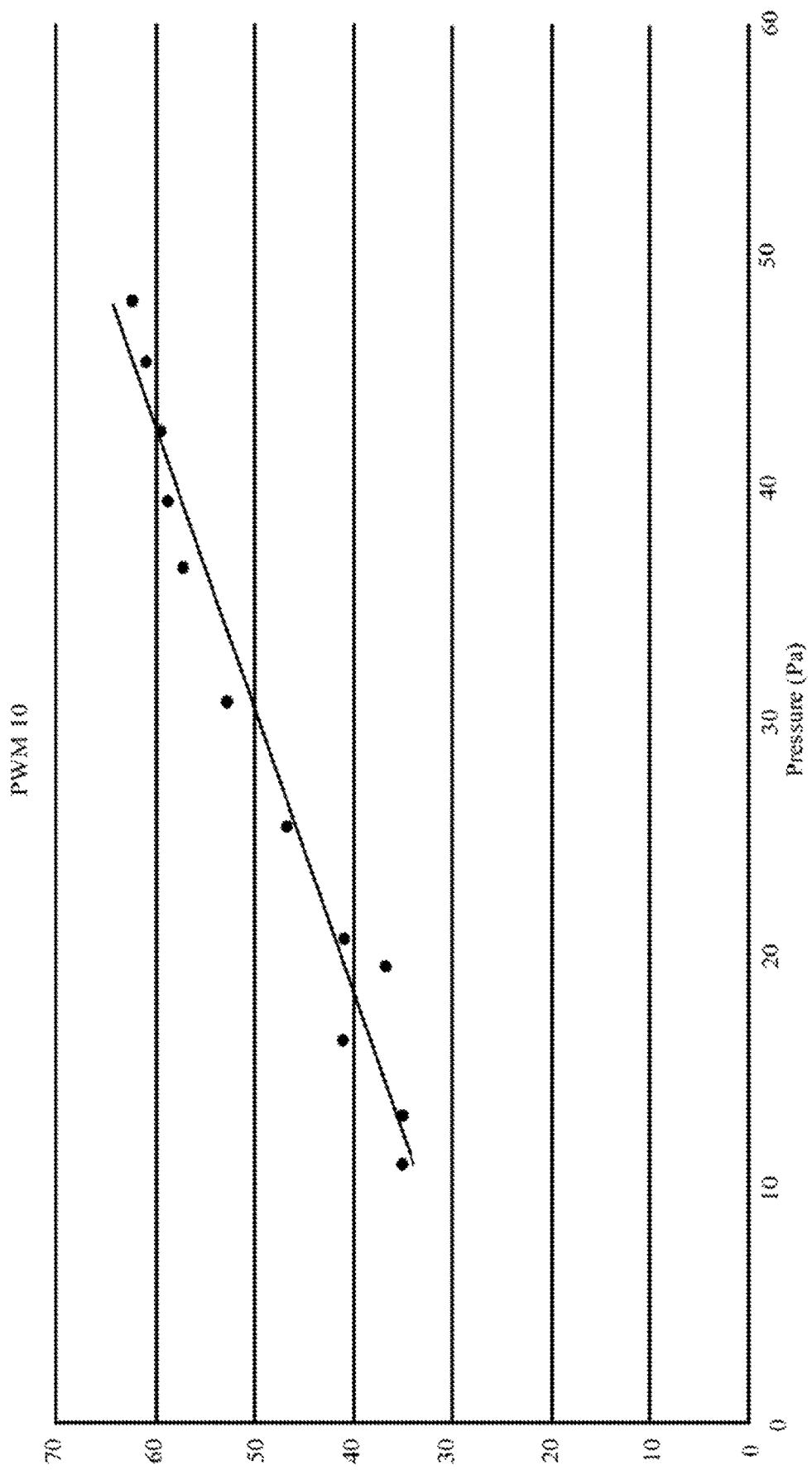
FIG. 5 is an example of a graph of power (current consumption in mA) against pressure for a fixed fan speed for a hot air circulation system in accordance with an example printer.

An illustration of the variation of current with pressure is graphically represented in FIG. 5 for a fan operating at 10 PWM in a commercially available printer. The graph shows that the current drawn by the fan increases with the pressure in the chamber 1. In accordance with the example illustrated in FIG. 5 a pressure of 30 Pa is the pressure to achieve the target flow (Qtarget) specified in the graph illustrated in FIG. 2.

In the foregoing, fluid impeller speed may refer to the speed of an element of a fluid impeller. In the case of a fan the element may be a fan blade and the speed may be the rotational speed of the fan blade which may be defined in terms of angular speed or linear speed of a datum point on a blade.

Insofar as the disclosure described above is implementable, at least in part, using a machine readable instruction-controlled programmable processing device such as a general purpose processor or special-purposes processor, digital signal processor, microprocessor, or other processing device, data processing apparatus or computer system it will be appreciated that a computer program for configuring a programmable device, apparatus or system to implement the foregoing described methods, apparatus and system is envisaged as an aspect of the present disclosure and claimed subject matter. The computer program may be embodied as any suitable type of code, such as source code, object code, compiled code, interpreted code, executable code, static code, and or dynamic code, for example. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. The term "computer" in its most general sense may encompass programmable devices such as referred to above, and data processing apparatus and computer systems in whatever format they may arise, for example, desktop personal computer, laptop personal computer, tablet, smart phone or other computing device.

The computer program may be stored on a computer readable storage medium in machine readable form, for example the computer readable storage medium may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD) subscriber identity module, tape, cassette solid-state memory. The computer program may be supplied from a remote source and embodied in a communications medium such as an electronic signal, radio frequency carrier wave or optical carrier waves. Such carrier media are also envisaged as aspects of the present disclosure.

As used herein any reference to "one disclosure" or "a disclosure" means that a particular element, feature, structure, or characteristic described in connection with the disclosure is included in at least one disclosure. The appearances of the phrase "in one disclosure" or the phrase "in an disclosure" in various places in the specification are not necessarily all referring to the same disclosure.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the disclosure. This is done merely for convenience and to give a general sense of the disclosure. This description should be read to include one or at least one and the singular also includes the plural unless it is obvious that it is meant otherwise.

Various modifications may be made within the scope of the disclosure. For example, inks other than those dried or cured may be used with the disclosure. Although the fluid flow distribution system has been described using a printer as an example of where such a system may be used, the disclosure is not limited to use with printers but may be implemented in other devices where a constant, substantially constant or controllable airflow is to be obtained. The disclosure has been described with reference to an impeller fan but the disclosure is not limited to such type of a fan.

Although the disclosure has been described with reference to a programmable integrated circuit such as a microcontroller other programmable devices such as referred to above may be used. Control circuit 3 may be implemented in hardware using discrete circuitry or machine-readable instructions or a combination thereof. Additionally, the power consumption of fan 6 may be provided by power sense circuit which outputs a signal indicative of power consumption (W).

The invention claimed is:

1. A circuit for controlling a fluid impeller in a fluid flow distribution system to achieve a target fluid flow, the circuit:
    to output a speed signal representative of a fluid impeller speed value ($N_T$) of the fluid impeller derived from a stored power consumption value ($W_i$) and fluid impeller speed value ($N_i$) pairs to achieve the target fluid flow;
    to receive a power signal representative of an input power consumption value (W) of the fluid impeller at the fluid impeller speed value ($N_T$) to input a fluid to the fluid flow distribution system;
    to compare the input power consumption value (W) represented by the power signal input to the circuit for the fluid impeller speed value ($N_T$) with the stored power consumption value ($W_i$) and fluid impeller speed value ($N_i$) pairs to determine a least difference fluid impeller speed value ($N_L$) of the stored pair comprising a least difference between the input power consumption value (W) and the stored power consumption value ($W_i$); and
    responsive to determining the least difference fluid impeller speed value ($N_L$), to output a speed signal representative of the least difference fluid impeller speed value ($N_L$).

2. A circuit according to claim 1, the circuit to compare the input power consumption value (W) represented by a power signal input to the circuit for the least difference fluid impeller speed value ($N_L$) with each of the stored power consumption value ($W_i$) and fluid impeller speed value ($N_i$) pairs to determine a second least difference fluid impeller speed value ($N'_L$) of the stored pair comprising a least difference between the input power consumption value (W) and the stored power consumption value ($W_i$).

3. A circuit according to claim 1, responsive to initiation of operation of the fluid impeller, to output the speed signal representative of the fluid impeller speed value ($N_T$) to achieve the target fluid flow.

4. A circuit according to claim 3, wherein the speed signal representative of the fluid impeller speed value ($N_T$) to achieve the target fluid flow is initially derived from the stored power consumption value ($W_i$) and fluid impeller speed value ($N_i$) pair comprising a lowest speed value of fluid impeller speed value ($N_i$).

5. A circuit according to claim 1, to access a memory store comprising the stored power consumption value ($W_i$) and fluid impeller speed value ($N_i$) pairs.

6. A circuit according to claim 5, comprising the memory store.

7. A circuit according to claim 1, wherein the circuit includes a processor and a memory store comprising instructions executable by the processor.

8. A printer, comprising a circuit according to claim 1.

9. A method for controlling a fluid impeller in a fluid flow distribution system to achieve a target fluid flow, the method comprising:
    outputting a speed signal representative of a fluid impeller speed value ($N_T$) of the fluid impeller derived from a stored power consumption value ($W_i$) and fluid impeller speed value ($N_i$) pairs to achieve the target fluid flow;
    receiving a power signal representative of an input power consumption value (W) of the fluid impeller at the fluid impeller speed value ($N_T$) to input a fluid to the fluid flow distribution system;
    comparing the input power consumption value (W) represented by the power signal input to the circuit for the fluid impeller speed value ($N_T$) with the stored power consumption value ($W_i$) and fluid impeller speed value ($N_i$) pairs to determine a least difference fluid impeller speed value ($N_L$) of the stored pair comprising a least difference between the input power consumption value (W) and the stored power consumption value ($W_i$); and
    responsive to determining the least difference fluid impeller speed value ($N_L$), outputting a speed signal representative of the least difference fluid impeller speed value ($N_L$).

10. A method according to claim 9, further comprising comparing the input power consumption value (W) represented by an input power signal for the least difference fluid impeller speed ($N_L$) with each of the stored power consumption value ($W_i$) and fluid impeller speed value ($N_i$) pairs to determine a second least difference fluid impeller speed value ($N'_L$) of the stored pair comprising a least difference between the input power consumption value (W) and the stored power consumption value ($W_i$).

11. A method according to claim 9, further comprising outputting the speed signal representative of a fluid impeller speed value ($N_T$) to achieve the target fluid flow responsive to initiation of operation of the fluid impeller.

12. A method according to claim 11, further comprising initially deriving the speed signal representative of a fluid impeller speed value ($N_T$) to achieve the target fluid flow from the stored power consumption value ($W_i$) and fluid impeller speed value ($N_i$) pair comprising a lowest speed value of fluid impeller speed value ($N_i$).

13. A method according to claim 9, further comprising accessing a memory store comprising the stored power consumption value ($W_i$) and fluid impeller speed value ($N_i$) pairs.

14. A non-transitory machine readable medium, comprising processor executable instructions executable by a processor to implement a method according to claim 9.

15. A method according to claim 9, further comprising looking up the stored power consumption value ($W_i$) and fluid impeller speed value ($N_i$) pairs in a look up table.

\* \* \* \* \*